United States Patent [19]

Pavelic et al.

[11] Patent Number: 4,561,914

[45] Date of Patent: Dec. 31, 1985

[54] SUBMERGED ARC WELDING FLUX

[75] Inventors: Vjekoslav Pavelic, Elm Grove, Wis.; Paul Tews, Cypress, Tex.

[73] Assignee: Wisconsin Alumni Research Foundation, Madison, Wis.

[21] Appl. No.: 663,228

[22] Filed: Oct. 22, 1984

[51] Int. Cl.$^4$ .............................................. B23K 35/34
[52] U.S. Cl. .......................................... 148/26; 75/53
[58] Field of Search ............................... 148/26; 75/53

[56] References Cited

U.S. PATENT DOCUMENTS

| | | | |
|---|---|---|---|
| 2,456,609 | 12/1948 | Andrews et al. | 219/8 |
| 2,802,762 | 8/1957 | Stetson et al. | 148/26 |
| 3,068,128 | 12/1962 | Shrubsall et al. | 148/26 |
| 3,320,100 | 5/1967 | Coless | 148/26 |
| 3,340,104 | 9/1967 | Balass et al. | 148/26 |
| 3,340,105 | 9/1967 | Balass et al. | 148/26 |
| 3,340,106 | 9/1967 | Balass et al. | 148/26 |
| 3,340,107 | 9/1967 | Balass et al. | 148/26 |
| 3,424,626 | 1/1969 | Coless et al. | 148/26 |
| 3,580,748 | 5/1971 | Delong | 148/26 |
| 3,667,111 | 6/1972 | Chartet | 29/495 |
| 3,769,099 | 10/1973 | DeLong | 148/26 |
| 3,951,328 | 4/1976 | Wallace | 148/26 |
| 4,207,121 | 6/1980 | Nakabayashi | 148/26 |

Primary Examiner—Peter D. Rosenberg
Attorney, Agent, or Firm—Quarles & Brady

[57] ABSTRACT

A flux for the submerged arc welding of aluminum-bronze comprises a granular mixture of cryolite and a binder. The flux preferably also contains alumina. A method for the submerged arc welding of aluminum-bronze employing the flux is disclosed.

11 Claims, No Drawings

SUBMERGED ARC WELDING FLUX

FIELD OF THE INVENTION

The invention relates to a submerged arc welding flux and, more particularly, to a submerged arc welding flux for copper alloys, especially aluminum-bronze.

BACKGROUND OF THE INVENTION

Copper alloys are used worldwide in applications with special requirements such as corrosion, oxidation, cavitation or wear resistance. The aluminum-bronze family, usually containing iron and, sometimes, nickel, is a very versatile member of the copper alloy system.

Aluminum-bronze is produced by both cast and wrought methods. Its tensile properties can be varied from a low of 50 ksi (345M Pa) to as high as 130 ksi (896M Pa). Hardness values range from 77 Rockewell F and 40 Rockwell C. Resistance to wear is excellent, especially when subjected to heavy unit loads. Like many other copper alloys, it has excellent corrosion resistance to many media.

All of the aluminum-bronze alloys are weldable, both for joining and overlay or surfacing. They are useful not only for welding to other copper aluminum alloys but also when many other copper alloys and even dissimilar metals are involved.

Weldments involving joining include such diverse applications as pump discharge columns, mixing bowls and paddles for dynamite and other explosives, submarine auxiliary propulsion units, large diameter pipe, chemical reaction vessels, etc.

Overlaying or surfacing, preferably with strip electrodes, on the other hand, is used for both initial installation and repair of such items as forming dies, hydroelectric wicket gates, turbine wear rings, marine propeller blades, torpedo ejection systems, ordnance such as gunslides and rotating bands and for many other applications.

To date, the welding methods most successfully employed with aluminum-bronze alloys have been the shielded metal-arc and gas metal-arc methods. However, when considering the high cost of labor it is recognized that welding by use of shielded metal-arc or gas metal-arc methods results in a relatively slow and expensive process.

If a more cost-effective method of welding could be developed, the usage of aluminum-bronze would be greatly enhanced. For example, if the surfacing or overlaying of aluminum-bronze were less expensive it could be used to provide protection for off-shore platform legs and riser pipes in the wave, tidal and splash zone, spiral wound and welded pipe, internal surfaces of pressure vessels in the chemical and petro-chemical industries, discs for large butterfly valves, and the like.

A proven cost-effective method for welding and overlaying steel, stainless steel, Monel and other competitive materials is known as submerged-arc welding. Submerged arc welding is a process wherein a blanket of granular flux is used to shield a welding electrode and the molten base metal of the parts being welded from the atmosphere.

The ideal flux for submerged arc welding also cleans the molten metal pool; it favorably modifies the chemical composition of the weld metal; and, it favorably influences the shape of the weld bead and its mechanical properties. It also forms a readily removable or free peeling fused slag to facilitate cleaning after use.

The submerged arc welding process is widely used because of its many advantages. It is readily adapted to the use of automatic equipment; the process allows for high deposition of weld metal; the process can be carried out at speeds significantly higher than those of other known welding techniques; and, it provides welds or overlays of larger thickness than other methods.

Unfortunately, it has not been possible to use the submerged arc welding process with copper alloys, such as aluminum-bronze because of the lack of suitable welding fluxes.

BRIEF SUMMARY OF THE PRESENT INVENTION

The main objects of the present invention are to disclose novel welding fluxes for use in the submerged arc welding of copper alloys and a method of welding employing such fluxes.

More specifically, the objects are to disclose a novel flux for use in the submerged arc welding of aluminum-bronze alloys and a method of welding employing that flux.

The submerged arc welding fluxes of the present invention are free flowing granular mixtures of cryolite ($Na_3AlF_6$) and a binder. The fluxes may contain alumina and additional ingredients such as fluorspar (calcium fluoride).

The fluxes of the present invention makes it possible to perform submerged arc welding and overlaying of aluminum alloys, such as aluminum-bronze, which could previously not be accomplished because of the lack of a suitable flux.

DETAILED DESCRIPTION

In the preferred practice of the present invention the welding flux contains from about 65% to about 98% cryolite, up to about 35% of alumina or up to about 35% calcium fluoride, and about 2% binder by weight. The flux is prepared by blending the cryolite and alumina with a binder followed by either fusion, sintering, or bonding. It is ground to pass through a 50-mesh screen.

In the fusion technique, the flux ingredients are mechanically mixed with each other and the mixture is placed in a graphite crucible and heated until it melts. After heating the molten mixture for about 20 more minutes to insure complete fusion, it is quenched to room temperature and then ground and crushed to the desired granular size.

The sintering technique comprises making a mechanical mixture of the ingredients and heating them in an oven at about 1650° F. for about 1½ hours. The mixture is then cooled, crushed, screened to obtain the desired particle distribution and used in the same manner as the fused materials.

Preferably, the flux is prepared by the bonding technique in which the cryolite and alumina mixture is combined with a binder (sodium silicate solution) in a ratio of about one part of binder to forty parts of the flux mixture. The mass is then heated to 900° F. for 3 hours or more, crushed and screened to obtain the desired granular size.

The raw materials used to prepare the flux of the present invention are preferably of the usual commercial purity, however incidental impurities that do not affect the function of the welding flux appreciatively may be present. The raw materials are preferably of a particle size that will pass through a 400-mesh screen.

The cryolite or sodium aluminum fluoride may be of a technical grade, as long as it does not contain materials which interfere with the desired properties of the flux. The alumina is calcined, and is of a commercial grade. It will normally contain 99% aluminum oxide after drying at 2000° F.

The flux may also contain up to 35% calcium fluoride ($CaF_2$). A convenient form is a mineral grade of fluorspar which contains at least 95 weight % $CaF_2$.

An especially preferred flux for use in the submerged arc welding of aluminum-bronze alloys contains 68.25 weight % cryolite, 29.25 weight % alumina and 2.5 weight % sodium silicate binder. It is made by the bonding technique and ground to pass through a 50-mesh screen.

The preferred flux was used to deposit multi-weld pads on aluminum-bronze plates, and multi-pass vee-groove welds between aluminum-bronze plates.

The practice of the invention is further illustrated by the description of the experimental work which follows.

EXPERIMENTAL WORK

Technical grade ingredients were used rather than analytic grade ingredients for two reasons; cost and the belief that the slag metal interactions would be affected by the large differences in flux composition and relatively unaffected by minor amounts of impurities in the raw ingredients. The raw ingredients were analyzed before use.

A. Cryolite

The cryolite used in this investigation was purchased from Great Lakes Mineral Co. The typical specifications for the cryolite are:

| Cryolite | $Na_3AlF_6$ | 93.0% |
|---|---|---|
| Sodium | Na | 32.0 |
| Aluminum | Al | 13.0 |
| Fluorine | F | 50.5 |
| Alumina | $Al_2O_3$ | 3.8 |
| Silicon | Si | .22 |
| Fluorspar | $CaF_2$ | .04 |
| Ferric Oxide | $Fe_2O_3$ | .05 |
| Moisture | $H_2O$ | .10 |

Alumina is the greatest contaminant, followed by silica and moisture. The cryolite used in this investigation was analyzed prior to use and found to contain less than 0.01% silicon. The typical physical analysis is:

| Sieve | Cumulative retained |
|---|---|
| +60 mesh | None |
| +100 mesh | .1% |
| +200 mesh | 4.2% |
| +325 mesh | 21.1% |

Other typical specifications are:

| Specific Gravity | 2.9 gr/$cm^3$ |
|---|---|
| Bulk Density | 64.37 lb./$ft.^3$ |
| pH | 8.7 |

B. Alumina

The alumina used for this investigation was supplied by Aluminum Company of Canada, Ltd., Chemicals Division. Typical impurity levels in this grade of alumina are only a few parts per million. The material was analyzed before use for silicon and manganese contamination. The results were:

| Impurity | Concentration |
|---|---|
| Silicon | 19 parts per million |
| Manganese | 12 parts per million |

C. Silica

The silica used for this investigation was purchased from Wedron Chemical Co., Wedron, Ill. The silica used in this research was designated as silica flour, and typically contains greater than 99% pure silica.

D. Sodim Silicate

Sodium silicate was supplied by PQ Corporation. The specification is:

| $SiO_2$ | 31.5% |
|---|---|
| $Na_2O$ | 19.7% |
| $H_2O$ | Balance |
| Ratio | 1.6 to 1 |
| pH | 13.4 |
| Viscosity | 7000 centipoise |

E. Distilled water was used in all fluxes.

FORMULATION

Table 1 contains the designation for each of the fluxes, the weight of the ingredients used in each batch of flux, and the date of manufacture. The procedure for mixing the ingredients is given below. The amount of silica in the sodium silicate must be added to the silica flour used in the fluxes to obtain the total amount of silica. The sodium silicate binder contributes about 1.5% $SiO_2$ to all of the fluxes.

MIXING PROCEDURE

All experimental fluxes were made in batch sizes of two kilograms. The dry ingredients were sifted, using a 10 mesh (2 mm) sieve, weighed, and transferred to a 7 liter stainless steel mixing bowl. In a smaller 2 liter stainless steel mixing bowl, the sodium silicate was carefully weighed out and a weighed amount of distilled water was added. The sodium silicate and distilled water were blended using a rubber spatula in the small stainless steel bowl and then poured into a plastic sprayer bottle using a funnel. The powdered ingredients were then dry mixed. After a few minutes of dry mixing, the sodium silicate and water solution was sprayed into the bowl containing the dry powder. Mixing was continued as the binder solution was sprayed onto the surface of the powdered ingredients. Care was taken to add the solution slowly enough so that none of the powder became saturated. A rubber spatula was used to scrape the sides of the bowl frequently. After all of the powder had become damp, the mixing speed was increased. Mixing was continued until the dampened powder began to agglomerate. The amount of sodium silicate and water solution needed to bring about the onset of agglomeration was carefully recorded after each batch and used to refine the quantity of solution used in succeeding batches. The typical time required to mix a batch of flux was 30 minutes. While mixing the powder, a dust mask and rubber gloves were worn. Two electrostatic precipitators were used to remove stray powder from the air. The agglomerated mix was then dumped on an 8 mesh (2.3 mm) screen and forced through the screen into an aluminium tray using a knife edge. The trays were approximately 5×50×50 centimeters. The damp flux was spread evenly over the bottom of the tray and allowed to air-dry for 24 hours. After the air-dry time, the fluxes were transferred to aluminium-lined steel trays approximately 5×22×32.5 centimeters and baked at 482° C. for 22 hours. The fluxes were then cooled to room temperature and again forced through the 8 mesh (2.3 mm) screen. Particles smaller than 35 mesh (420 micron) in size were discarded. The remaining granules ranging from 8 to 35 mesh in size were transferred to 3 liter containers with resealable plastic lids.

WELD TRIALS

The experimental fluxes were used to deposit weld pads and vee-groove welds. The multi-layer pads were deposited to test the weld metal soundness, weld metal chemistry, slag chemistry, weld bead shape and slag removability. The vee-groove welds were deposited to test the ability of the flux to produce porosity-free and slag-free welds with adequate mechanical properties such as tensile strength and elongation.

ALUMINUM BRONZE WELD PADS

The eight experimental fluxes in Table 1 were used to deposit aluminum-bronze weld pads on aluminum-bronze plate for the purpose of testing weld metal soundness, weld metal chemistry, slag chemistry, weld bead shape and slag removability. The following is a summary of the material specification and the welding procedure.

A. Materials Used for Aluminum-Bronze Weld Pads

The base plate used for aluminum-bronze welds was 25 mm. thick Ampco grade 8 plate. The plates were cut into 20×20 cm squares. A disk grinder was used to remove the heavy oxide layer from both the top and bottom surfaces. Three sets of three lines each were scribed on the top of the plate. Each set of lines consisted of three parallel lines spaced 12 mm apart. The electrode used for the weld was 3.2 mm diameter Ampco-Trode 10. The electrode was received in the form of a 50 cm diameter loose coil. The wire was cleaned with acetone soaked cotton and wound on a 30.5 cm diameter spool form. The wire was kept covered when not in use. Table 2 gives the specified nominal chemical composition for Ampco grade 8 plate and AmpcoTrode 10 Electrode. Table 2 also gives the actual chemical analysis of the electrode and base plate used in this investigation.

TABLE 1
FLUX FORMULATIONS

| Flux Designation | $Na_3AlF_6$ Grams | $Al_2O_3$ Grams | $CaF_2$ Grams | $Na_2SiO_2$ Grams* | $H_2O$ Grams** |
|---|---|---|---|---|---|
| Eutectic | 1209 | 331.5 | 409.5 | 97.6 | |
| BA1 | 1925 | 0 | 0 | 146 | 360 |
| BA2 | 1850 | 100 | 0 | 98 | 340 |
| BA3 | 1750 | 200 | 0 | 98 | 330 |
| BA4 | 1650 | 300 | 0 | 98 | 360 |
| BA5 | 1550 | 400 | 0 | 98 | 340 |
| BA6 | 1450 | 500 | 0 | 98 | 360 |
| BA7 | 1350 | 600 | 0 | 98 | 380 |

*$Na_2O\ SiO_2$ is actually 48.8 weight % water, i.e., 100 grams $Na_2O\ SiO_2$ contains 31.5 grams $SiO_2$, 19.7 grams $Na_2O$, 48.8 grams $H_2O$.
**This is water in addition to the water in the $Na_2O\ SiO_2$.

TABLE 2
NOMINAL AND ACTUAL CHEMISTRIES OF MATERIALS USED

| ELEMENT | AMPCO-TRODE 10 | AMPCO 8 |
|---|---|---|
| Specified Nominal Chemical Analysis | | |
| Aluminum | 9.0–11.0 | 6.5 |
| Iron | 1.5 Max | 2.5 |
| Tin | 0.25 | 0.25 |
| Other | 0.50 Max | 0.25 |
| Copper | Balance | 90.5 |
| Actual Chemical Analysis of Materials Used in These Tests | | |
| Aluminum | 9.84 | 6.97 |
| Iron | .74 | 2.51 |
| Tin | .24 | 0.24 |
| Nickel | NA | 0.04 |
| Copper | 89.16 | 90.24 |

B. Welding Procedure for Aluminum-Bronze Weld Pads.

Prior to use, the fluxes were removed from the 3 liter containers with resealable plastic lids and placed in 5×27×30 cm steel pans and baked at 120° C. for 4 hours. After each weld, the unfused flux from each weld was sieved using in 8-mesh screen and returned to the 120° C. holding oven. The initial weld of each pad was deposited without plate pre-heat. Successive welds were deposited with a pre-heat between room temperature and 200° F. The plates were not clamped to the work table. The alignment of the plate on the table was maintained by clamping bars to the table which were butted against the ends of the aluminum-bronze plate. The carriage travel motion was carefully aligned with the scribed line on the plate surface. The carriage travel mechanism was engaged and used to bring the welding electrode up to the starting position for the weld. A 50 millimeter high by 50 millimeter wide flux dam was placed on the plate and filled to a depth of 50 centimeters with flux. After depositing the weld, the unfused flux was screened using the 8 mesh screen and returned to the tray in the 120° C. holding oven. The fused flux was discarded except for the fused flux from the 6th bead of each weld pad, which was saved for later chemical analysis. During welding, a dust mask was worn and welding fumes and dust were ventilated. The plate was cooled in forced air to below 93° C. before preparing to deposit the next weld bead. Prior to welding, the weld pad was wire brushed. The welding parameters were as follows:

| Electrode | ⅛" dia. Ampco-Trode 10 |
|---|---|
| Arc Voltage | 32 volts DCRP |
| Wire Feed Speed | 90 inches per minute |
| Amperage | 450 to 500 Amps |
| Travel Speed | 10.5 inches per minute |
| Torch-to-work angle | Perpendicular |
| Flux depth | 2 inches |
| Stick out length | 1.5 inches |

C. Method of Analysis for Aluminum-Bronze Weld Pads.

The aluminum-bronze weld pads were deposited to test weld metal soundness, weld metal chemistry, slag chemistry, weld bead shape, and slag removeability. Weld metal soundness was determined by cross-sectioning the welds, polishing the cross-sections and visually examining the polished cross-sections for evidence of porosity. Weld metal chemistry was analyzed using emission spectroscopy for aluminum, iron, silicon, and manganese. A Leco oxygen analyzer was used to analyze for weld metal oxygen. Slag chemistry was analyzed by means of emission spectroscopy. Pieces of slag removed from the midsection of the top bead of each weld were prepared for analysis by mounting the pieces in a 2 part epoxy resin, polishing the faces to 600 grit, and then coating the polished faces with a film of electrically conductive carbon. Several areas of each slag face were sampled. Care was taken to avoid entrapped metal particles. Weld bead shape was judged by visual appearance. Criteria used to judge weld bead shape included smoothness and the weld bead to base plate wetting angle. Slag removeability was judged on a comparative basis.

D. Results of Aluminum-Bronze Weld Pad Tests.

All the weld beads deposited with the flux mixtures given in Table 1 were free of porosity. Weld metal chemistry and slag chemistry are given in Table 3 and 4. The silicon content decreased with increasing alumina content, and was below 0.01 weight percent for the eutectic flux, and fluxes BA1, BA3, BA5, BA6, and BA7. Weld bead shape and slag detachability were excellent for all the fluxes. Weld bead appearance and slag removeability improved with increasing alumina content in the BA series of fluxes.

TABLE 3

| | WELD METAL CHEMICAL ANALYSIS | | | | |
|---|---|---|---|---|---|
| Flux | Al | Fe | Si | Mn | O |
| Eutectic | 7.87 | 1.25 | 0.02 | — | * |
| BA1 | 8.40 | 1.13 | 0.09 | — | .0021 |
| BA2 | 8.66 | 1.05 | 0.11 | — | .0017 |
| BA3 | 8.42 | 1.07 | 0.09 | — | .0016 |
| BA4 | 8.78 | 0.98 | 0.10 | — | .0019 |
| BA5 | 8.66 | 1.11 | 0.07 | — | .0021 |
| BA6 | 8.57 | 1.09 | 0.06 | — | .0020 |
| BA7 | 8.64 | 1.11 | 0.03 | — | .0026 |

*Not analyzed

TABLE 4

| | SLAG CHEMICAL ANALYSIS | | | | | | | |
|---|---|---|---|---|---|---|---|---|
| Flux | O | F | Na | Al | Si | Mn | Fe | Cu |
| Eutectic** | 17.8 | 22.4 | 20.1 | 19.5 | 2.5 | .0 | .1 | .3 |
| BA1 | 18.1 | 41.3 | 22.8 | 15.5 | 1.2 | .0 | .1 | .4 |
| BA2 | 18.6 | 31.4 | 25.3 | 22.1 | 1.4 | .0 | .2 | .4 |
| BA3 | 20.8 | 29.7 | 23.3 | 23.2 | 1.7 | .0 | .0 | .4 |
| BA4 | 25.7 | 26.5 | 21.1 | 23.2 | 1.3 | .0 | .0 | 1.0 |
| BA5 | 23.2 | 25.4 | 20.5 | 26.8 | 1.4 | .0 | .0 | 1.1 |
| BA6 | 27.9 | 22.7 | 19.6 | 26.1 | 1.5 | .0 | .0 | 1.1 |
| BA7 | 22.6 | 19.5 | 19.7 | 31.9 | 3.5 | .0 | .0 | 1.6 |

**The Eutectic composition also had 16.7 wt % Ca

ALUMINUM-BRONZE VEE-GROOVE WELDS

Two of the experimental fluxes in Table 1 were used to deposit aluminum-bronze vee-groove welds between two aluminum-bronze plates for testing the ability of the fluxes to produce porosity-free and slag-free welds with adequate tensile strength and elongation.

A. Materials Used for Aluminum-Bronze Vee-Groove Welds. One vee-groove weld was made with the flux designated as eutectic in Table 1. A second vee-groove weld was made with the flux designated as BA7 in Table 1. Both fluxes were manufactured as previously described.

The base plate used for the aluminum bronze vee-groove welds was the same 25 mm thick Ampco grade 8 plate used for the weld pad tests. The electrode used for the vee-groove welds was 3.2 mm Ampco-Trode 10. The nominal chemistries for the base plate and electrode are given in Table 2. The plates were cut into 152×304 mm rectangles. One long edge of each plate was beveled by plasma-arc cutting and grinding.

B. Welding Procedure for Aluminum-Bronze Vee-Grove Welds. Prior to use, the fluxes were baked at 120° C. for 4 hours. After each weld, the unfused flux was discarded along with the fused flux. The plates were clamped to a 50 mm thick strongback during welding to minimize distortion and simulate actual welding stresses in shop and field fabrication. The plates and strongback were preheated to 315° C. and maintained at this temperature between passes. Six passes were deposited on the top or front side of the vee-groove. The root was ground down to clean metal on the back side and a single 7th pass deposited on the back. The welding parameters used to deposit the vee-groove welds were the same as those used to deposit the weld pads.

C. Method of Analysis for Aluminum-Bronze Vee-Groove Welds.

The vee-groove welds were tested by radiography, transverse tensile tests, and transverse side bend tests. Reduced section tensile specimens were prepared per ASTM standard QW-462.1 (a). Side bend specimens were prepared per ASTM standard QW-462.2 (a). Both vee-groove welds were radiographed. Two tensile and three side bend specimens were tested for the eutectic flux. Two tensile and two side bend specimens were tested for the flux BA7.

D. Results of Aluminum-Bronze Vee-Groove Welds.

The radiograph of the vee-groove weld made with the flux designated as eutectic showed some porosity. The results of the reduced section tensile tests were 56.6 ksi. The side bend test contained some defects longer than ⅛ inch.

The radiograph of the vee-groove welds made with flux designated as BA7 showed no porosity. The results of the reduced section tensile tests were 76.5 ksi with 31.5% elongation and 67.3 ksi with 20.5% elongation. Both side bend tests passed the criteria given for acceptance in ASTM standard QW-463.

SUMMARY

The results of the experimental work demonstrated that fluxes of cryolite and a binder and those which contained cryolite, alumina and a binder produced acceptable welds.

The fluxes of the present invention also may be used in other welding methods, for example, the fluxes could be used as the flux core of a hollow tubular welding wire or to coat a suitable electrode or overlay strip.

It will be understood by those skilled in the art that the described embodiments are for purposes of illustration only and that a number of variations and modifications can be made by those skilled in the art without departing from the spirit and scope of the invention. Therefore, it is intended that the scope of the invention not be limited except by the claims which follow.

I claim:

1. A flux for the submerged arc welding of aluminum-bronze consisting essentially of a granular mixture which contains about 65% to about 98% of cryolite, up to about 35% by weight of alumina, up to about 35% by weight of calcium fluoride and about 2% of a binder by weight.

2. A flux of claim 1 which also contains about 2% to about 35% by weight of alumina.

3. A flux of claim 1 which also contains about 1% to about 35% by weight of calcium fluoride.

4. A flux of claim 1 which contains about 65% cryolite by weight.

5. The flux of claim 1 in which the binder is sodium silicate.

6. A method of welding aluminum-bronze using the submerged arc welding process which comprises in part shielding the welding electrode and the molten base metal of the parts being welded under a layer of flux granules consisting essentially of cryolite, up to about 35% by weight of alumina, up to about 35% by weight of calcium fluoride and a binder.

7. The method of claim 6 in which the flux granules contain about 65% to about 98% of cryolite, up to about 35% of alumina and about 2% of binder by weight.

8. A flux for the submerged arc welding of aluminum-bronze comprises a free flowing mixture of granules consisting essentially of cryolite and a binder.

9. A flux of claim 8 in which the granules also contain alumina.

10. A flux of claim 8 in which the granules also contain calcium fluoride.

11. A flux of claim 8 in which the binder in the granules is sodium silicate.

* * * * *